(12) United States Patent
Naitou

(10) Patent No.: US 8,398,899 B2
(45) Date of Patent: Mar. 19, 2013

(54) METHOD FOR MANUFACTURING OPTICAL WAVEGUIDE

(75) Inventor: Ryusuke Naitou, Ibaraki (JP)

(73) Assignee: Nitto Denko Corporation, Ibaraki-shi, Osaka (JP)

(*) Notice: Subject to any disclaimer, the term of this patent is extended or adjusted under 35 U.S.C. 154(b) by 489 days.

(21) Appl. No.: 12/483,353

(22) Filed: Jun. 12, 2009

(65) Prior Publication Data

US 2010/0032853 A1 Feb. 11, 2010

(30) Foreign Application Priority Data

Aug. 11, 2008 (JP) .................... 2008-206658

(51) Int. Cl.
*B29D 11/00* (2006.01)

(52) U.S. Cl. ...... 264/1.28; 264/1.1; 264/1.24; 264/1.25; 264/1.26; 264/1.27; 264/1.29; 264/1.31; 264/1.32; 264/1.33; 264/1.34; 264/1.38; 264/1.6; 264/1.7; 264/1.8; 264/1.9; 264/2.1; 264/2.2; 264/2.3; 264/2.4; 264/2.5; 264/2.6; 264/2.7; 264/259; 264/240; 264/241; 264/260; 264/271.1; 264/272.11; 264/272.13; 264/275; 264/279; 264/279.1; 264/298

(58) Field of Classification Search ............. 264/1.28, 264/1.1, 1.24, 1.27, 1.25, 1.31, 1.32, 1.36–1.38, 264/1.7, 1.8, 2.2, 2.5, 2.7, 297.4, 1.26, 1.29, 264/1.33, 1.34, 1.6, 1.9, 2.1, 2.3, 2.4, 2.6, 264/494, 495, 496, 134, 135, 240, 241, 259, 264/260, 271.1, 272.11, 272.13, 275, 279, 264/279.1, 298; 385/123, 130, 129; 427/162, 427/163.1, 163.2; 438/31

See application file for complete search history.

(56) References Cited

U.S. PATENT DOCUMENTS

| 4,798,431 | A | * | 1/1989 | Clark et al. .................... 385/74 |
| 5,555,335 | A | * | 9/1996 | Barker et al. ................. 385/100 |
| 2004/0005128 | A1 | * | 1/2004 | DiGiovanni et al. ......... 385/123 |
| 2004/0086243 | A1 | * | 5/2004 | DiGiovanni et al. ......... 385/123 |
| 2005/0151271 | A1 | * | 7/2005 | Tatsuzawa et al. ........... 257/783 |
| 2006/0147163 | A1 | * | 7/2006 | Mayhew et al. ............. 385/100 |
| 2011/0117331 | A1 | * | 5/2011 | Mikkelsen ................ 428/195.1 |

FOREIGN PATENT DOCUMENTS

| JP | 2005-165138 A | 6/2005 |
| JP | 2006-259361 A | 9/2006 |

* cited by examiner

*Primary Examiner* — Jeffrey Wollschlager
*Assistant Examiner* — Stella Yi
(74) *Attorney, Agent, or Firm* — Westerman, Hattori, Daniels & Adrian, LLP

(57) ABSTRACT

A method for manufacturing an optical waveguide includes: step A of forming a first resin layer 23 by allowing a first liquid-state resin to flow to be extended in a manner so as to bury and enclose cores 22; step B of forming a second resin layer 25 by allowing a second liquid-state resin having a viscosity higher than that of the first liquid-state resin to flow to be extended on the first resin layer 23, after or while the first resin layer 23 is heated; and step C of forming an overcladding layer 26 by curing the first resin layer 23 and the second resin layer 25.

7 Claims, 5 Drawing Sheets

METHOD FOR MANUFACTURING OPTICAL WAVEGUIDE

BACKGROUND OF THE INVENTION

1. Field of the Invention

The present invention relates to a method for manufacturing an optical waveguide including cores and an over-cladding layer covering the cores.

2. Description of the Related Art

An optical waveguide, which is light-weight and capable of carrying out a high-speed signal transmission, has been expected to be utilized as various kinds of electronic devices. As the manufacturing method for such an optical waveguide, a method for forming an over-cladding layer by allowing a liquid-state resin to flow to be extended in a manner so as to cover cores that are pattern-formed has been known (see Japanese Unexamined Patent Application Publication No. 2005-165138).

In an optical waveguide obtained by a conventional manufacturing method, light passing through the cores is scattered greatly to cause a problem of low optical transmission efficiency. An object of the present invention is to provide a method for manufacturing an optical waveguide that has small light scattering passing through the cores so that a high optical transmission efficiency is achieved.

SUMMARY OF THE INVENTION

The present inventor made intensive studies, and as a result, he found that the reason for a low optical transmission efficiency of the optical waveguide manufactured by the conventional method lies in the fact that bubbles are adhered to the surface of the cores. Upon forming an over-cladding layer by allowing a liquid-state resin to flow to be extended on the surface of cores, these bubbles adhere to the periphery of the cores to remain thereon. When bubbles are located on the periphery of the cores, light that passes through the cores is scattered due to the bubbles to cause a reduction in the optical transmission efficiency.

FIGS. 1(a) to 1(c) are respectively a schematic view that shows a conventional method for manufacturing an optical waveguide. FIG. 1(a) shows a state in which cores 12 are pattern-formed on an under-cladding layer 11. In the conventional manufacturing method, as shown in FIG. 1(b), a liquid-state resin having a high viscosity is next allowed to flow to be extended over the under-cladding layer 11 in a manner so as to bury and enclose the cores 12 so that a resin layer 13 is formed. The reason for using the liquid-state resin having a high viscosity is to make a film thickness of the resin layer 13 thicker. At this time, bubbles 14 tend to adhere to the periphery of the cores 12. Since the viscosity of the resin layer 13 is high, the adhered bubbles 14 are hardly moved from the periphery of the cores 12. For this reason, when the resin layer 13 is cured to form an over-cladding layer 15, the bubbles 14 are left to remain on the periphery of the cores 12 as shown in FIG. 1(c).

FIGS. 2(a) to 2(c) are schematic views that show a method for manufacturing an optical waveguide in accordance with the present invention. FIG. 2(a) shows a state in which cores 22 are pattern-formed on an under-cladding layer 21. In the manufacturing method of the present invention, upon forming an over-cladding layer, as shown in FIG. 2(b), first, a first liquid-state resin having a low viscosity (for example, 800 mPa·s or less) is allowed to flow to be extended on the under-cladding layer 21 in a manner so as to bury and enclose the cores 22 so that a first resin layer 23 is formed. Since the first liquid-state resin has a low viscosity, the thickness of the first resin layer 23 is thin. At this time, bubbles 24 tend to easily adhere to the periphery of the cores 22 in the same manner as in the conventional method.

Here, when the first resin layer 23 is heated, while the viscosity of the first resin layer 23 is further lowered, the bubbles 24 are expanded. For this reason, as shown in FIG. 2(c), the bubbles 24 are moved from the periphery of the cores 22, and released to the outside of the first resin layer 23. Thus, it becomes possible to remove most of the bubbles 24 from the periphery of the cores 22. At this time, the first resin layer 23 is effectively used when its viscosity is low. The first liquid-state resin is made from, for example, an ultraviolet-ray curable resin, and is not cured even by heating.

Next, as shown in FIG. 2(d), a second liquid-state resin having a higher viscosity (for example, 1,000 mPa·s or more) is allowed to flow and extended over the first resin layer 23 so that a second resin layer 25 is formed thereon. Since the second liquid-state resin has a higher viscosity, it is not excessively applied to be expanded so that the second resin layer 25 is formed with a sufficient thickness (for example, 500 μm or more). Since the viscosity of the second liquid-state resin is higher than that of the first liquid-state resin, the thickness of the second resin layer 25 becomes thicker than that of the first resin layer 23.

Next, as shown in FIG. 2(e), the first resin layer 23 and the second resin layer 25 are irradiated with, for example, ultraviolet rays, and consequently cured to form an over-cladding layer 26. An optical waveguide 20 is manufactured by the manufacturing method of the present invention as described above.

The gist of the present invention is described as follows:

(1) A method for manufacturing an optical waveguide containing a plurality of cores and an over-cladding layer covering the plurality of cores, wherein the method includes step A of forming a first resin layer by allowing a first liquid-state resin to flow to be extended in a manner so as to bury and enclose the cores; step B of forming a second resin layer by allowing a second liquid-state resin having a viscosity higher than that of the first liquid-state resin to flow to be extended on the first resin layer, after or while the first resin layer is heated; and step C of forming an over-cladding layer by curing the first resin layer and the second resin layer.

(2) The method for manufacturing an optical waveguide according to the present invention is characterized in that the second resin layer has a thickness greater than the thickness of the first resin layer.

(3) The method for manufacturing an optical waveguide according to the present invention is characterized in that the first resin layer and the second resin layer comprise an active energy-ray curable resin.

(4) The method for manufacturing an optical waveguide according to the present invention is characterized in that, in steps B and C, either one or both of a light-releasing portion and a light-incident portion of the ends of the over-cladding layer are molded into lens shapes.

(5) The method for manufacturing an optical waveguide according to the present invention is characterized in that the lens-shaped portion molded at each end of the over-cladding layer has an elongated lens shape formed into virtually a ¼ arc shape in the cross section thereof perpendicular to the longitudinal axis of the optical waveguide.

ADVANTAGES OF THE INVENTION

The manufacturing method of the present invention makes it possible to obtain an optical waveguide having high optical transmission efficiency. Moreover, by molding a light-releasing portion at the end of the over-cladding layer into a lens shape, an optical waveguide device capable of releasing parallel light beams from its tip end can be obtained. Moreover, by molding the light incident portion of the end of the over-cladding layer into a lens shape, an optical waveguide device capable of condensing light beams that have been made incident on the tip end into the cores is obtained.

For a full understanding of the present invention, reference should be made to the following detailed description of the preferred embodiments of the invention as illustrated in the accompanying drawings.

DESCRIPTION OF THE PREFERRED EMBODIMENTS

Figure 1:
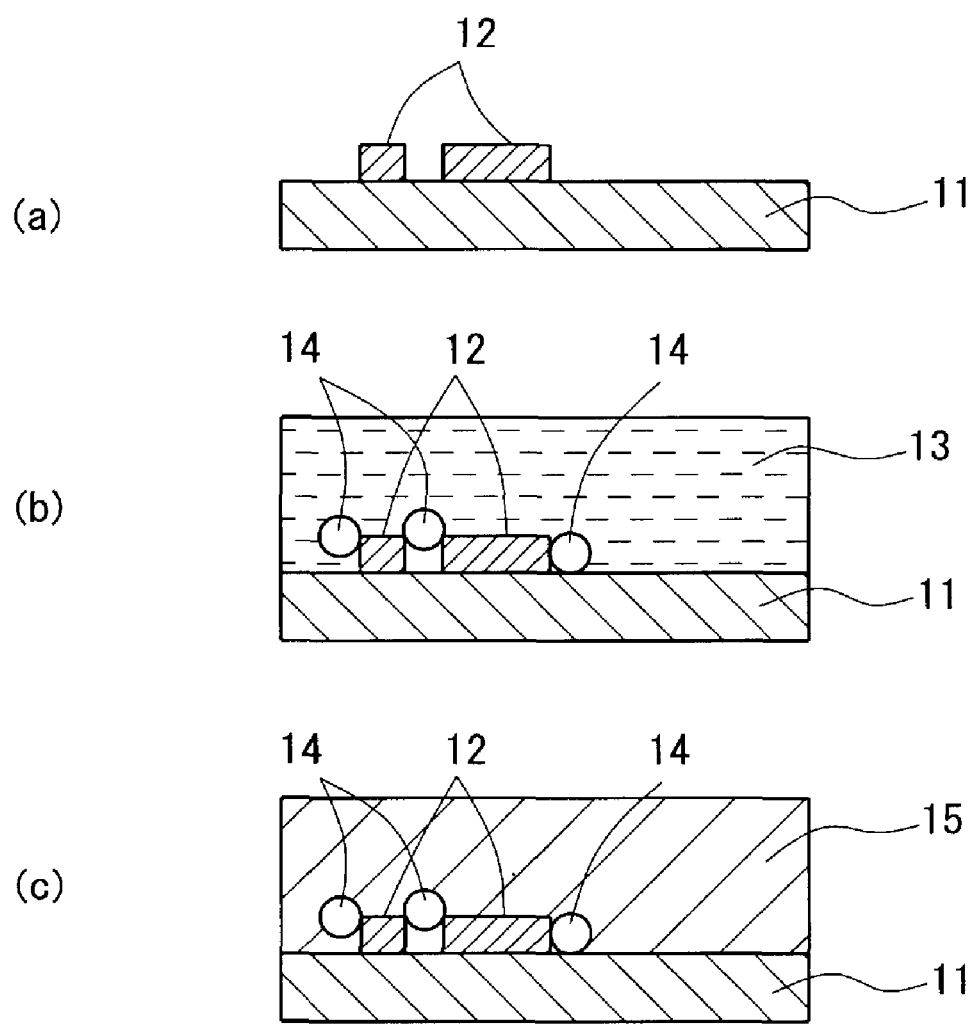
FIGS. 1(a) to 1(c) are schematic views that show a conventional method for manufacturing an optical waveguide.
Figure 2:
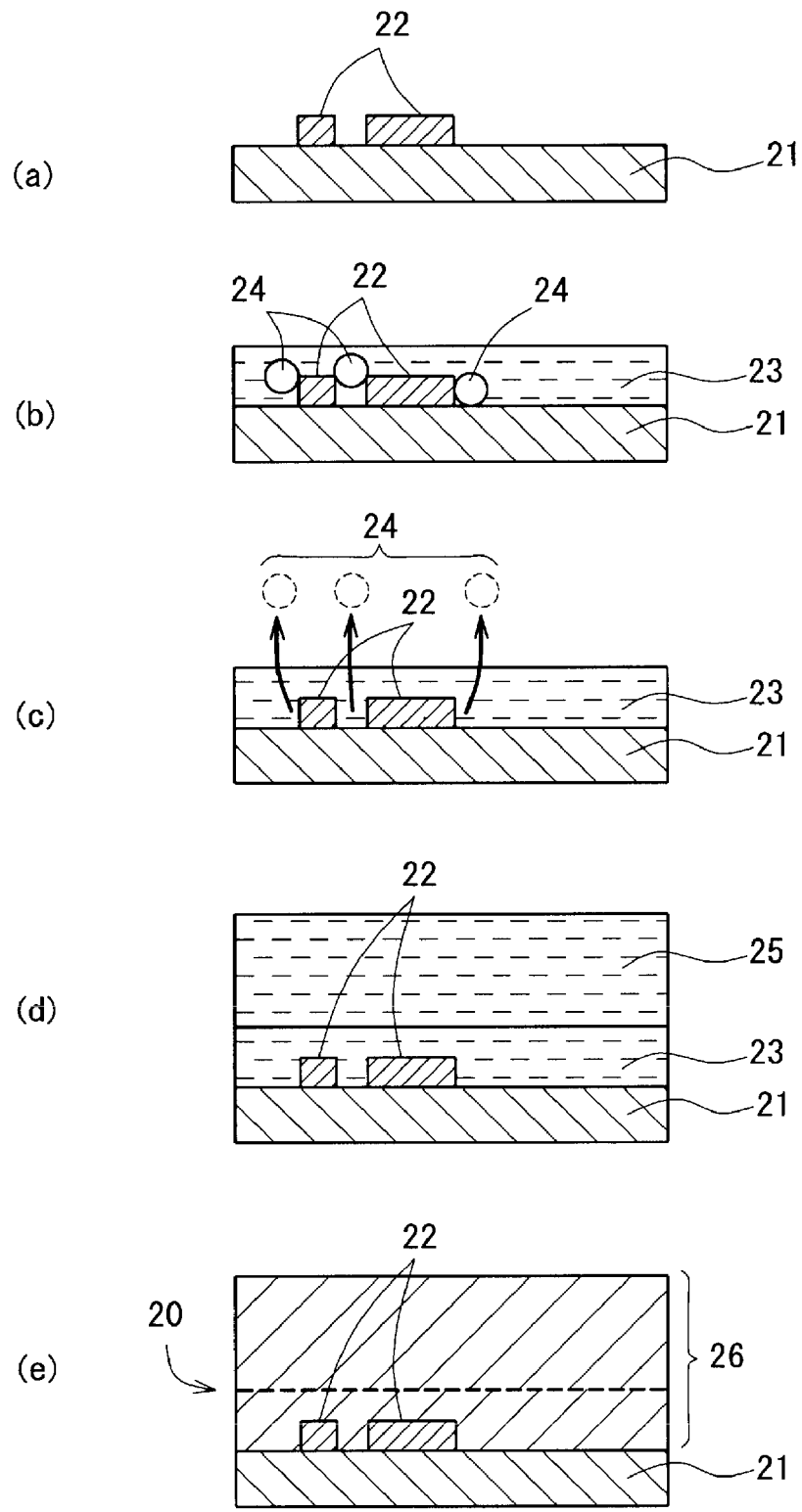
FIGS. 2(a) to 2(e) are schematic views that show a method for manufacturing an optical waveguide of the present invention.
Figure 3:
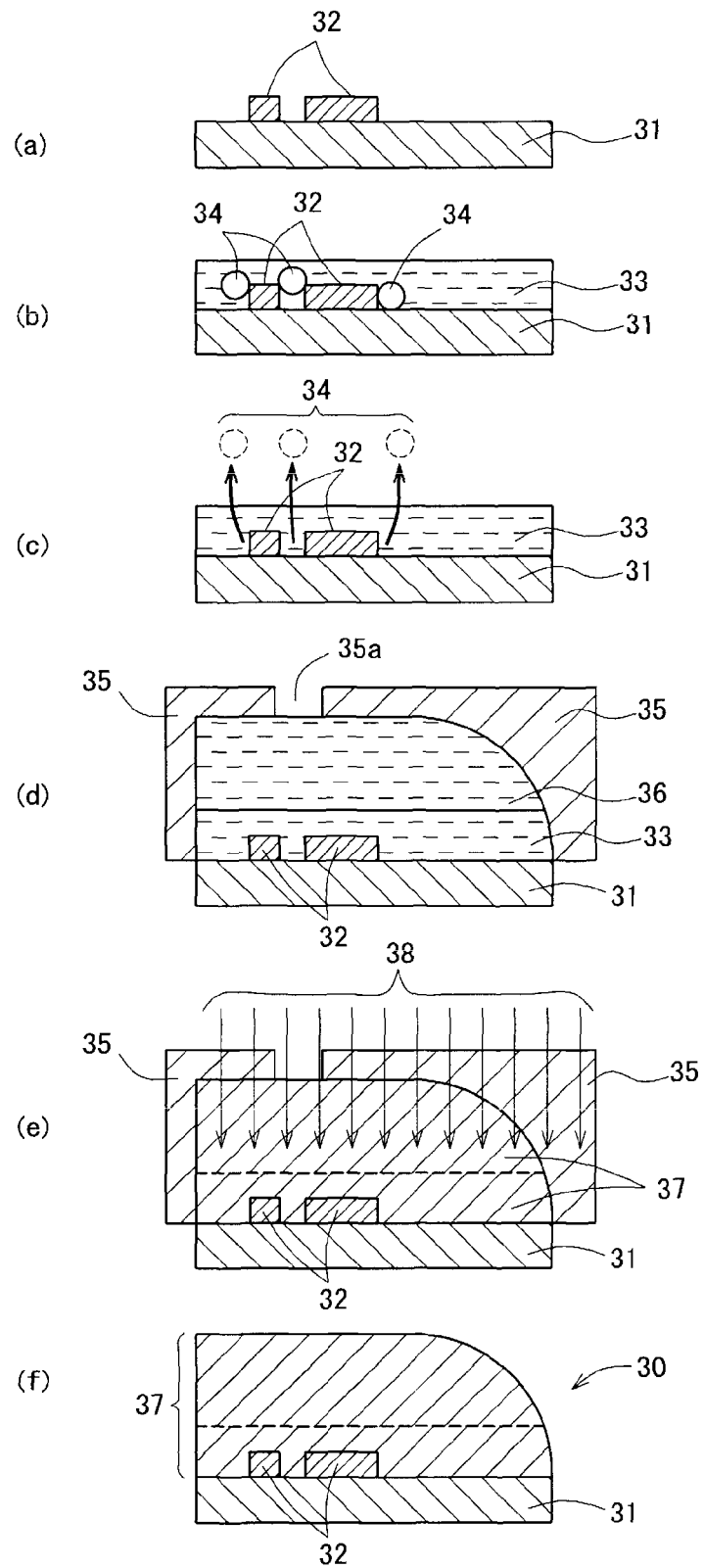
FIGS. 3 (a) to 3(f) are schematic views that show another method for manufacturing an optical waveguide of the present invention.
Figure 4:
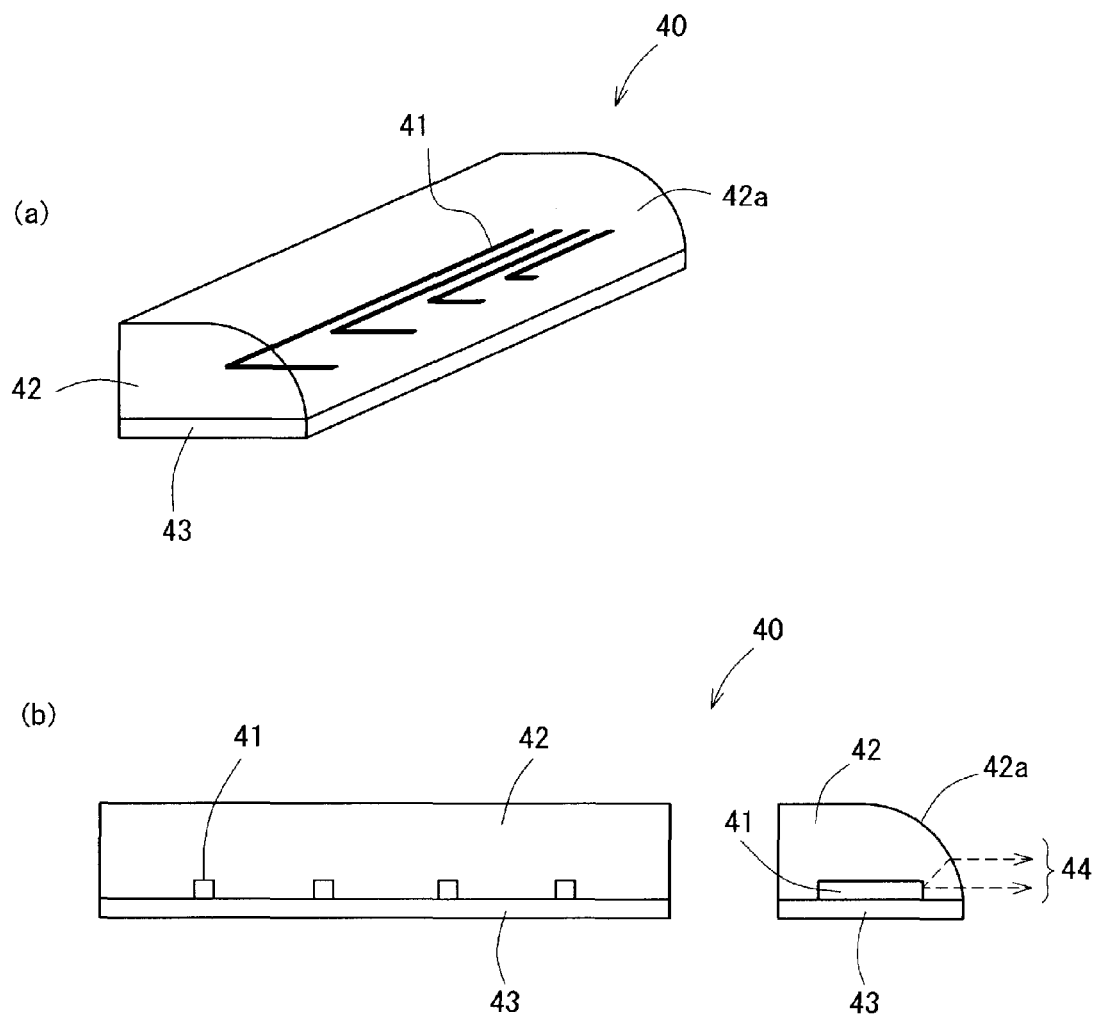
FIGS. 4 (a) and 4(b) are schematic views that show an optical waveguide obtained by the manufacturing method of the present invention.

The preferred embodiments of the present invention will now be described with reference to FIGS. 1 to 5 of the drawings. Identical elements in the various figures are designated with the same reference numerals.

[Method for Manufacturing Optical Waveguide of the Invention]

The present invention provides a method for manufacturing an optical waveguide containing a plurality of cores and an over-cladding layer covering the plurality of cores. The method for manufacturing an optical waveguide of the present invention includes step A of forming a first resin layer by allowing a first liquid-state resin to flow to be extended in a manner so as to bury and enclose the cores; step B of forming a second resin layer by allowing a second liquid-state resin having a viscosity higher than that of the first liquid-state resin to flow to be extended on the first resin layer, after or while the first resin layer is heated; and step C of forming an over-cladding layer by curing the first resin layer and the second resin layer.

In accordance with the manufacturing method of the present invention, since bubbles adhered onto the periphery of cores can be effectively removed, it is possible to obtain cores and a cladding layer that are less susceptible to light scattering. As a result, an optical waveguide having a high optical transmission efficiency can be manufactured.

In a conventional manufacturing method, as the viscosity of a liquid-state resin is higher (for example, 1,000 mPa·s or more), or as the thickness of a resin layer to be consequently formed into an over-cladding layer is thicker (for example, 500 μm or more), it becomes more difficult to remove bubbles adhered onto the periphery of cores. The manufacturing method of the present invention is, in particular, superior in the effect for removing bubbles under such conditions.

FIGS. 3(a) to 3(c) are schematic views that show a method for manufacturing an optical waveguide of the present invention in preferred embodiments. FIG. 3(a) shows a state in which cores 32 are formed on an under-cladding layer 31 as a pattern. In the manufacturing method of the present invention, upon forming the over-cladding layer, first, as shown in FIG. 3(b), a first liquid-state resin, which has a low viscosity (for example, 800 mPa·s or less), is allowed to flow and extended over the under-cladding layer 31 so as to bury and enclose the cores 32 so that a first resin layer 33 is formed. At this time, in the same manner as in the conventional method, bubbles 34 easily adhere to the periphery of the cores 32. When the first resin layer 33 is heated, while the viscosity of the first resin layer 33 is further lowered, the bubbles 34 are expanded. For this reason, as shown in FIG. 3(c), the bubbles 34 move from the periphery of the cores 32 to be released to the outside of the first resin layer 33. In this manner, most of the bubbles 34 on the periphery of the cores 32 can be removed. At this time, the effect becomes higher, when the viscosity of the first resin layer 33 is made lower and when the thickness thereof is made thinner. The first liquid-state resin is, for example, an ultraviolet-ray curable resin, and is not cured by heating.

Next, as shown in FIG. 3(d), a transparent concave-shaped mold 35 having a vent hole 35a that communicates with the outside formed in the concave section is put on the first resin layer 33, and a second liquid-state resin having a higher viscosity (for example, 1,000 mPa·s or more) is allowed to flow and expand inside the concave-shaped mold 35 through the vent hole 35a so that a second resin layer 36 is formed. Since the second liquid-state resin has a higher viscosity, it is not excessively applied and spread so that the second resin layer 36 is formed with a sufficient thickness (for example, 500 μm or more).

Next, as shown in FIG. 3(e), the first resin layer 33 and the second resin layer 36 are irradiated with, for example, ultraviolet rays 38 through the concave-shaped mold 35 so that they are cured to form an over-cladding layer 37. Lastly, as shown in FIG. 3(f), the concave-shaped mold 35 is removed so that an optical waveguide 30 is manufactured.

The preferred embodiment of the manufacturing method of the present invention includes the following steps A to D. Step A: a step of forming a plurality of cores on an under-cladding layer. Step B: a step of forming a first resin layer by allowing a first liquid-state resin having a lower viscosity to flow to be extended over the under-cladding layer so as to bury and enclose the cores. The first resin layer is preferably made from a resin that is curable by an active energy ray, such as ultraviolet rays or the like. Step C: a step of forming a second resin layer by removing bubbles from the periphery of the cores after or while heating the first resin layer, thereafter allowing a second liquid-state resin having a higher viscosity to flow to be extended. The second resin layer is also preferably made from a resin that is curable by an active energy ray, such as ultraviolet rays or the like. Step D: a step of forming an over-cladding layer by irradiating the first resin layer and the second resin layer with an active energy ray, such as ultraviolet rays or the like to be cured.

[Step A]

In the step A of the present invention, the first liquid-state resin having a low viscosity is allowed to flow to be extended so that a first resin layer in which the cores are buried and enclosed is formed. The first liquid-state resin includes a resin having a refractive index lower than that of the cores. Although not particularly limited, an active energy-ray curable resin is preferably used as the first liquid-state resin. Since, upon carrying out a heating process to be described later, the curing process hardly progresses in the active energy-ray curable resin, the resin is desirably used for removing bubbles. In the present specification, the "active energy-ray curable resin" refers to a resin in which a cross-linking process progresses by a function of infrared rays, ultraviolet-rays, an electron beam or the like to be formed into a stable state that is hardly dissolved and fused. The active energy-ray curable resin is preferably prepared as an ultraviolet-ray curable resin. The ultraviolet-ray curable resin prior to curing normally contains a photo-polymerizable prepolymer that is polymerized by a photochemical function, and in addition to this, may also contain a reactive diluent, a photo-polymerization initiator, a solvent, a leveling agent and the like.

From the viewpoint of easily moving bubbles adhered to the periphery of the cores, the viscosity of the first liquid-state resin is preferably set at 1 mPa·s to 800 mPa·s, more preferably 1 mPa·s to 500 mPa·s, most preferably 2 mPa·s to 300 mPa·s. These viscosities are obtained based on a measuring method described in examples.

The first resin layer is a layer obtained by allowing the first liquid-state resin to flow to be extended in a manner so as to bury and enclose the cores. The thickness of the first resin layer, which is suitably determined, depending on the height of the cores, is preferably set at 15 μm to 150 μm. Although not particularly limited, a spin coating method, a dipping method, a casting method and the like are used as the method for allowing the first resin to flow to be extended.

The cores are formed by a material having a refractive index higher than that of the over-cladding layer. As a material used for forming the cores, an ultraviolet-ray curable resin having a superior pattern-forming property is preferably used. Preferable examples of the ultraviolet-ray curable resin include acryl-based ultraviolet-ray curable resins, epoxy-based ultraviolet-ray curable resins, siloxane-based ultraviolet-ray curable resins, norbornene-based ultraviolet-ray curable resins, polyimide-based ultraviolet-ray curable resins and the like.

Although not particularly limited, a dry etching method, a transfer method, an exposing/developing method, a photobleaching method and the like may be used as the method for pattern-forming the cores.

The cores are normally formed on the surface of a base material or an under-cladding layer. Normally, the base material and the under-cladding layer have a refractive index lower than that of the cores. Although not particularly limited, the shape of a cross section perpendicular to the longitudinal axis of the cores is preferably formed into a trapezoidal shape or a square shape. The width of the cores is preferably set at 10 μm to 500 μm, and the height of the cores is preferably set at 10 μm to 100 μm. When the cores have a trapezoidal shape, the width of the cores corresponds to the length of the lower bottom, and the height of the cores corresponds to a length of a line segment connecting the middle point of the upper bottom and the middle point of the lower bottom.

[Step B]

In the step B of the present invention, after bubbles have been removed from the periphery of the cores after heating the first resin layer, or while heating the first resin layer, formed in the step A, by allowing a second liquid-state resin having a higher viscosity to flow to be extended, a second resin layer that is thicker than the first resin layer is formed.

The heating process of the first resin layer is carried out so as to remove bubbles adhered to the periphery of the cores. When the first resin layer is heated, the viscosity of the first resin layer is further lowered to allow the bubbles to expand. For this reason, the bubbles are easily moved from the periphery of the cores, and easily released to the outside of the first resin layer. Since the viscosity of the first liquid-state resin is low, the thickness of the first resin layer is thin so that bubbles are easily released to the outside.

The temperature to which the first resin layer is heated is preferably set at 40° C. to 120° C., more preferably, 60° C. to 120° C., although, when a solvent is contained in the first resin layer, it depends on the boiling point of the solvent.

The material of the second liquid-state resin may be the same as that of the first liquid-state material, or may be different therefrom, as long as it has a viscosity higher than that of the first liquid-state resin. The viscosity of the second liquid-state resin is preferably set at 1,000 mPa·s to 6,000 mPa·s, more preferably, 1,000 mPa·s to 4,000 mPa·s. By using the second liquid-state resin having a viscosity of this level, it becomes possible to form an over-cladding layer having a thickness of, for example, 50 μm to 5 mm.

Although not particularly limited, an active energy-ray curable resin is preferably used as the second liquid-state resin, and more preferably, an ultraviolet-ray curable resin like that of the first liquid-state resin is used. The viscosity of the ultraviolet-ray curable resin can be increased or decreased by suitably adjusting the content of a reactive diluent and a solvent.

[Step C]

When a liquid-state active energy-ray curable resin is used as the first and second liquid-state resins, the first and second resin layers are kept in an uncured state until irradiation with the active energy-ray. The uncured first and second resin layers are preferably cured by irradiation with an active energy-ray. The ultraviolet rays are preferably used as the active energy-ray. The dose of the ultraviolet rays is preferably set at 1,000 mJ/cm$^2$ to 8,000 mJ/cm$^2$. Within this condition range, the first and second resin layers can be sufficiently cured.

The over-cladding layer, obtained by curing the first resin layer and the second resin layer, may have a multiple-layer structure, with the first resin layer and the second resin layer having a clear border face, or may have a single-layer structure in which the first resin layer and the second resin layer have a mixedly integrated structure. The single-layer structure is more preferable because of its superior optical transmission efficiency.

As shown in FIGS. 3(d) and 3(e), in one embodiment of the manufacturing method of the present invention, after forming a first resin layer 33, a concave-shaped mold 35 is put on the first resin layer 33, and by allowing a second liquid-state resin to flow to be extended to the inside of the concave-shaped mold 35, a second resin layer 36 can be formed. In accordance with this manufacturing method, an over-cladding layer 37 having a higher thickness (for example, 800 μm or more) can be formed. Moreover, by controlling the inner shape of the concave-shaped mold 35, the over-cladding layer 37 may be molded into a shape (for example, a lens shape) having a desired function.

[Optical Waveguide]

FIG. 4(a) is a perspective view that schematically shows an optical waveguide obtained by the manufacturing method of the present invention, and FIG. 4(b) shows a front view and a side view thereof. The optical waveguide 40, obtained by the manufacturing method of the present invention, includes cores 41 and an over-cladding layer 42 that covers the cores 41. Preferably, as shown in FIGS. 4(a) and 4(b), the optical waveguide 40 includes an under-cladding layer 43 and the over-cladding layer 42 formed on the under-cladding layer 43. Preferably, the over-cladding layer 42 is formed into a lens-integrated-type over-cladding layer with its tip portion 42a molded into a lens shape.

The lens-integrated-type over-cladding layer is obtained by molding the tip portion of the over-cladding layer into a lens shape in the steps B and C. An optical waveguide, provided with such a lens-integrated-type over-cladding layer, can be coupled to an optical element, such as a light-emitting element and a light-receiving element, and used as an optical waveguide device.

When the cladding layer is composed of the under-cladding layer 43 and the over-cladding layer 42, the thickness of the under-cladding layer 43 is preferably set at 5 μm to 10 mm. The thickness of the over-cladding layer 42 is preferably set in the range from 10 μm to 10 mm, which is thicker than that of the under-cladding layer 43.

When the lens-shaped portion is integrally molded with the tip portion 42a of the over-cladding layer 42, the lens-shaped portion is preferably prepared as a convex lens shape, and more preferably prepared as a convex lens shape, with its cross section perpendicular to the longitudinal axis of the optical waveguide being shaped into virtually a ¼ arc shape (shape formed by half-cutting a lenticular lens along its longitudinal axis). Its curvature radius is preferably set at 300 μm to 5 mm, more preferably, 500 μm to 3 mm.

When the tip portion 42a of the over-cladding layer 42 is molded into a convex lens shape, as shown in FIG. 4(b), light beams, released from a core 41, are formed into parallel light beams 44 by the convex lens shaped portion, and allowed to proceed without being expanded. Moreover, although not shown in the figures, light beams that are made incident on the tip portion of the over-cladding layer are formed into light beams that are converged to the core by the convex lens shaped portion so that they are efficiently made incident on the core.

[Applications]

Although the applications of the optical waveguide produced by the manufacturing method of the present invention are not particularly limited, the optical waveguide is preferably used for, for example, an optical wiring plate, an optical connector, a substrate with optical-electric devices mixedly mounted, an optical touch panel and the like.

EXAMPLES

Example 1

Preparation for Cladding-Layer-Forming Varnish (Component A) Epoxy-based ultraviolet-ray curable resin having an alicyclic skeleton (EP4080E, made by Adeka Corporation) 100 parts by weight
(Component B) Photo-acid generator (CPI-200K, made by SAN-APRO Ltd.) 2 parts by weight
These components were mixed to prepare a cladding-layer-forming varnish.

[Preparation for Core-Forming Varnish]
(Component C) Epoxy-based ultraviolet-ray curable resin containing a fluorene skeleton (OGSOL EG, made by Osaka Gas Chemicals Co., Ltd.) 40 parts by weight
(Component D) Epoxy-based ultraviolet-ray curable resin containing a fluorene skeleton (EX-1040, made by Nagase Chemtex Corporation) 30 parts by weight
(Component E) 1,3,3-tris(4-(2-(3-oxycetanyl))butoxyphenyl)butane (the preparation method thereof will be described later) 30 parts by weight
1 part by weight of the component B and 41 parts by weight of ethyl lactate were mixed so that a core-forming vanish was prepared.

Method for Preparing
1,3,3-tris(4-(2-(3-oxycetanyl))butoxyphenyl)butane

Into a 200 ml-volume three-neck flask equipped with a thermometer, a cooling pipe and a stirring device, 6.68 g (20 mmol) of 1,3,3-tris(4-hydroxy phenyl)butane and 25 ml of N-methyl-2-pyrrolidone were charged, and stirred while being heated to 80° C. in a nitrogen atmosphere, until these were completely dissolved. After dissolving, to this was further added 23.46 g (72 mmol) of cesium carbonate, and further stirred for 30 minutes. Thereto was added 7.84 g (66 mmol) of 2-(3-oxycetanyl)butyltosylate preliminarily synthesized, and stirred for 20 hours at 80° C. in a nitrogen atmosphere. After completion of the reaction, this was cooled to room temperature, and thereto were then added 100 ml of ethyl acetate and 50 ml of distilled water, and this was then left stood so as to be separated into an aqueous phase and an organic phase. The organic phase thus separated was extracted, and this was further washed with water, and dried for one night by using magnesium sulfuric anhydride. Thereafter, magnesium sulfate was filtered and separated, and the solvent thereof was further distilled off so that a reaction coarse product was obtained. This coarse product was separated and refined by silica gel column chromatography (eluting solution: n-hexane/acetone) so that 12.20 g of a colorless transparent semi-solid matter (yield: 97%) was obtained. The compound thus obtained was analyzed by using $^1$H-NMR and $^{13}$C-NMR (both of these made by Nippon Denshi Co., Ltd.) so that 1,3,3-tris(4-(2-(3-oxycetanyl))butoxyphenyl)butane was confirmed.

[Production of Optical Waveguide]

The cladding-layer-forming varnish was applied to the surface of a polyethylene naphthalate film having a thickness of 188 μm, and after being irradiated with 1,000 mJ/cm² of ultraviolet rays, this was subjected to a heating treatment at 80° C. for 5 minutes so that an under-cladding layer having a thickness of 20 μm was formed. The under-cladding layer had a refractive index of 1.510 at a wavelength of 830 nm.

The core-forming varnish was applied to the surface of the under-cladding layer, and this was subjected to a heating treatment at 100° C. for 5 minutes so that a core layer was formed. The core layer was covered with a photomask (gap: 100 μm) and this was irradiated with 2,500 mJ/cm² of ultraviolet rays, and further subjected to a heating treatment at 100° C. for 10 minutes. Unirradiated portions with ultraviolet rays of the core layer were dissolved and removed by a γ-butyrolactone aqueous solution, and this was subjected to a heating treatment at 120° C. for 5 minutes so that a plurality of cores having a core width of 20 μm and a core height of 50 μm were pattern-formed. The plurality of cores respectively had a refractive index of 1.592 at a wavelength of 830 nm.

The cladding-layer-forming varnish (first liquid-state resin) having a viscosity of 2 mPa·s was applied in a manner so as to cover the cores so that a first resin layer having a thickness of 60 μm was formed. The first resin layer was heated at 80° C. for 5 minutes so that bubbles located on the periphery of the cores were removed. Thereafter, a concave-shaped mold made of quartz was pressed onto the first resin layer, and the cladding-layer-forming varnish (second liquid-state resin) having a viscosity of 3,000 mPa·s was allowed to flow to be extended into the concave-shaped mold so that a second resin layer was formed. Here, the viscosity of the cladding-layer-forming varnish was adjusted by suitably increasing or reducing the amount of methyl ethyl ketone serving as a diluent.

The first resin layer and the second resin layer were irradiated with 2,000 mJ/cm² of ultraviolet rays through the concave-shaped mold, and then subjected to a heating treatment at 80° C. for 5 minutes so that the first resin layer and the second resin layer were cured to form an over-cladding layer. Thereafter, the concave-shaped mold was separated therefrom. Thus, the over-cladding layer having a thickness of 1 mm, thus molded, was provided with an elongated convex lens formed into virtually a ¼ arc shape (shape formed by half-cutting a lenticular lens along its longitudinal axis) in its cross section perpendicular to the longitudinal axis of the optical waveguide at its tip portion. The curvature radius of the convex lens was 1.5 mm, and the refractive index of the over-cladding layer at a wavelength of 830 nm was 1.510.

The optical waveguide thus obtained was provided with an under-cladding layer (thickness: 20 μm), a plurality of cores (width: 20 μm, height: 50 μm) pattern-formed on the under-cladding layer, and an over-cladding layer (thickness: 1 mm) formed on the under-cladding layer in a manner so as to cover the cores.

Example 2

An optical waveguide was manufactured in the same processes as in Example 1 except that the viscosity of the cladding-layer-forming varnish (first liquid-state resin) used for forming the first resin layer was changed to 200 mPa·s.

Example 3

An optical waveguide was manufactured in the same processes as in Example 1 except that the viscosity of the cladding-layer-forming varnish (first liquid-state resin) used for forming the first resin layer was changed to 500 mPa·s.

Comparative Example

An optical waveguide was manufactured in the same processes as in Example 1 except that the viscosity of the cladding-layer-forming varnish (first liquid-state resin) used for forming the first resin layer was changed to 3,000 mPa·s.

[Evaluation]

Figure 5:
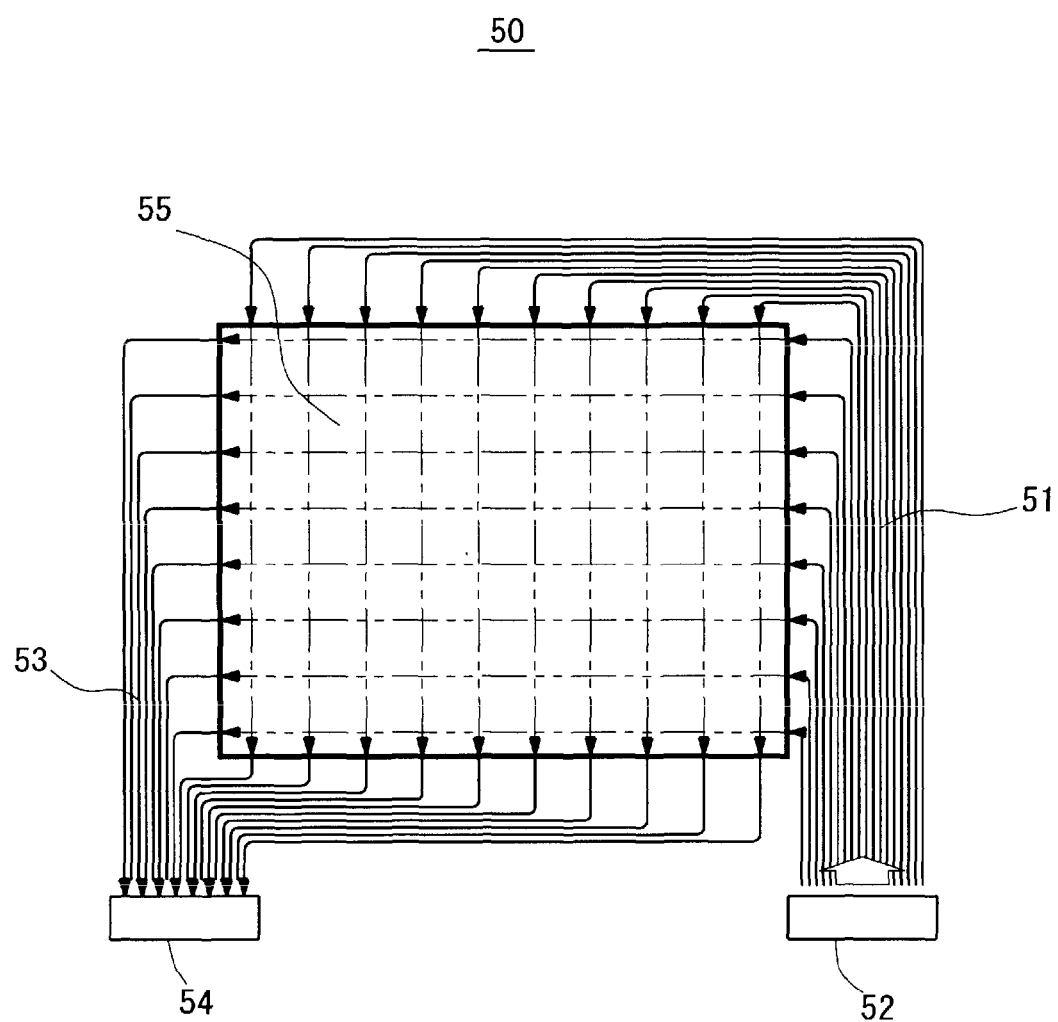
FIG. 5 is a schematic view that shows an optical touch panel.

Two pieces of each of L-letter-type optical waveguides having a lens-integrated-type over-cladding layer, manufactured in examples 1 to 3 and a comparative example, were prepared. As shown in FIG. 5, light-emitting elements 52 (VECSEL, made by Optowell Co., Ltd.) for releasing light having a wavelength of 850 nm were coupled to the end of one of optical waveguides 51, while light-receiving elements 54 (CMOS linear sensor array, made by TAOS Co., Ltd.) were coupled to the end of the other optical waveguide 53. The respective optical waveguides 51 and 53 were disposed so as to face each other with a coordinate input area 55 interposed therebetween so that an optical touch panel 50 having 3 inches in diagonal length was manufactured.

Light having an intensity of 5 mW was outputted from each of the light-emitting elements 52, and the received light intensity was measured by each of the light-receiving elements 54. Table 1 shows the results. The received light intensity of each of the optical waveguides of examples was higher than that of the comparative example so that it was found that each of the optical waveguides of examples had a higher optical transmission efficiency.

TABLE 1

| | Viscosity of liquid-state resin (mPa · s) | | | |
|---|---|---|---|---|
| | First liquid-state resin | Second liquid-state resin | Bubbles on the periphery of cores | Received light intensity (mW) |
| Example 1 | 2 | 3,000 | No | 0.9 |
| Example 2 | 200 | 3,000 | No | 0.9 |
| Example 3 | 500 | 3,000 | A little | 0.7 |
| Comparative Example | 3,000 | 3,000 | Yes | 0.5 |

[Measuring Method]
[Viscosity]

By using a Stress Rheo Meter (HAKKE Rheo Stress 600, made by ThermoHAAKE Co., Ltd.), measurements were carried out at a temperature of 25° C.

[Refractive Index]

The cladding-layer-forming varnish and the core-forming varnish were respectively applied to silicon wafers by a spin coating method to form films thereon so that refractive-index measuring samples were prepared, and these were measured by using a prism coupler (made by Thyron Co., Ltd.).

[Core Width, Core Height]

Each of the manufactured optical waveguides was cut with cross sections by using a Dicer-type cutter (DAD522, made by DISCO Co., Ltd.), and the cross-sectional face was observed and measured by using a laser microscope (made by Keyence Corporation).

This application claims priority from Japanese Patent Application No. 2008-206658, which is incorporated herein by reference.

It is to be understood that the present invention may be practiced in other embodiments in which various improvements, modifications, and variations are added on the basis of knowledge of those skilled in the art without departing from the spirit of the present invention. Further, any of the specific inventive aspects of the present invention may be replaced with other technical equivalents for embodiment of the present invention, as long as the effects and advantages intended by the invention can be insured. Alternatively, the integrally configured inventive aspects of the present invention may comprise a plurality of members and the inventive aspects that comprise a plurality of members may be practiced in a integrally configured manner.

There has thus been shown and described a novel method for manufacturing optical waveguide which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for manufacturing an optical waveguide comprising a plurality of cores and an over-cladding layer covering the plurality of cores, the method comprising:
   forming a first resin layer by allowing a first liquid-state resin to flow to be extended in a manner so as to bury and enclose the plurality of cores, the first liquid-state resin being a resin that is not cured by heating;

heating the first resin layer to lower the viscosity of the first resin layer;

forming a second resin layer by allowing a second liquid-state resin having a viscosity higher than that of the first liquid-state resin to flow to be extended on the first resin layer, after heating the first resin layer or while heating the first resin layer; and forming an over-cladding layer by curing the first resin layer and the second resin layer.

2. The method according to claim 1, wherein the second resin layer has a thickness greater than the thickness of the first resin layer.

3. The method according to claim 1 or 2, wherein the first resin layer and the second resin layer comprise an active energy-ray curable resin.

4. The method according to claim 1 or 2, wherein, the forming the second resin layer includes molding either one end or both ends of the first liquid state resin and the second liquid state resin into a lens shape, and the forming the over-cladding layer includes curing the first resin layer and the second resin layer while molding either one end or both ends of the first liquid state resin and the second liquid state resin into the lens shape.

5. The method according to claim 3, wherein, the forming the second resin layer includes molding either one end or both ends of the first liquid state resin and the second liquid state resin into a lens shape, and the forming the over-cladding layer includes curing the first resin layer and the second resin layer while molding either one end or both ends of the first liquid state resin and the second liquid state resin into the lens shape.

6. The method according to claim 4, wherein the lens-shaped portion molded at each end of the over-cladding layer has an elongated lens shape formed into virtually a ¼ arc shape in the cross section thereof perpendicular to the longitudinal axis of the optical waveguide.

7. The method according to claim 5, wherein the lens-shaped portion molded at each end of the over-cladding layer has an elongated lens shape formed into virtually a ¼ arc shape in the cross section thereof perpendicular to the longitudinal axis of the optical waveguide.

* * * * *